United States Patent
Margon et al.

(10) Patent No.: US 10,057,083 B2
(45) Date of Patent: Aug. 21, 2018

(54) MULTI-SENSOR ELECTROMAGNETIC RADIATION AND MECHANICAL SIGNAL FUSION

(71) Applicants: Kenneth Margon, Oakland, CA (US); Pragash Sangaran, Oakland, CA (US)

(72) Inventors: Kenneth Margon, Oakland, CA (US); Pragash Sangaran, Oakland, CA (US)

(73) Assignee: Innowave IP LLC, Oakland, CA (US)

( * ) Notice: Subject to any disclaimer, the term of this patent is extended or adjusted under 35 U.S.C. 154(b) by 30 days.

(21) Appl. No.: 15/011,391

(22) Filed: Jan. 29, 2016

(65) Prior Publication Data

US 2016/0226677 A1    Aug. 4, 2016

Related U.S. Application Data

(60) Provisional application No. 62/109,402, filed on Jan. 29, 2015.

(51) Int. Cl.
| | |
|---|---|
| *H04L 12/66* | (2006.01) |
| *H04L 12/46* | (2006.01) |
| *H04L 7/00* | (2006.01) |
| *H04L 29/08* | (2006.01) |

(52) U.S. Cl.
CPC ............ *H04L 12/46* (2013.01); *H04L 7/0016* (2013.01); *H04L 67/12* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,295,409 B1* | 10/2012 | Su | .................. | H04L 27/0012 375/262 |
| 2007/0018890 A1* | 1/2007 | Kulyukin | ............. | G01C 21/005 342/357.31 |
| 2013/0073261 A1* | 3/2013 | Kim | .................... | G06K 9/6289 702/189 |
| 2013/0173926 A1* | 7/2013 | Morese | .................. | G06F 19/10 713/186 |
| 2016/0182165 A1* | 6/2016 | Margon | ............... | H04B 17/318 455/67.13 |

* cited by examiner

*Primary Examiner* — Frank Duong
(74) *Attorney, Agent, or Firm* — San Diego IP Law Group LLP; Trevor Coddington (57) ABSTRACT

The present invention provides a system and method for fusing data collected from detected electromagnetic radiation and mechanical signals. The system is comprised of sensors that may be configured into an array of sensors. A "Full Spectrum" sensor fuses the output data of the sensors with the fused output data synchronized according to time. The fused output data is accessible by a plurality of application platforms that may use the data to provide meaningful feedback from detected events to improve daily life. The system and method is configurable according to a particular application platform to use only relevant data points from the sensors that is subsequently fused by the "Full Spectrum" sensor.

20 Claims, 7 Drawing Sheets

MULTI-SENSOR ELECTROMAGNETIC RADIATION AND MECHANICAL SIGNAL FUSION

CROSS-REFERENCE TO RELATED APPLICATION

The present application claims priority U.S. Provisional Patent Application No. 62/109,402, filed on Jan. 29, 2015, entitled "Multi-sensor Electromagnetic Radiation and Mechanical Signal Fusion" the entire disclosure of which is incorporated by reference herein.

BACKGROUND OF THE INVENTION

1. Field of Invention

This invention relates generally to electromagnetic radiation (EMR) sensors and more specifically, to applications and apparatus that use the fused output of sensors covering a multitude of electromagnetic radiation (EMR) spectra to create "Full Spectrum" sensor(s) capable of sensing physical and electromagnetic events in an environment with fixed sensors and body worn sensors.

2. Description of Related Art

There is a need to monitor the environment for safety, creating systems to assist us in daily tasks, provide feedback on our activities to help us improve our lifestyles, and for commercial use of the data related to our events to provide meaningful alternatives and products. There is an ecosystem that is created by sensors, processing of sensor data, transport of the information, and interface devices that allow a user to interact and modify their environment to suite their lifestyle. The general theme of this interaction is to provide a platform for "Comfort Living" using a wide array of technology.

We live in a spectrum of energy from low frequencies, conducted through mechanical movement, to radio frequency and then light. There are many sensors developed by various industries that can receive different parts of the spectrum. While the output from these sensors can be collected and cross correlated to infer events, as individual uncoordinated sensor elements they do not directly report the many important events with a high degree of observational certainty as the events occur in our environment. This is the case whether these events occur in the home, outside, office or retail, or public space.

U.S. Pat. No. 8,085,882 and U.S. Pat. No. 8,295,409 use multiple receivers and fuse the low level signals to improve the signal to noise level sufficiently to be able to classify and demodulate the signal. The limitation being that identical sensors sense identical parts of the spectrum.

Many of today's sensors have the potential for misuse and invasion of privacy so as we increase the collection of data about our environment and personal activities, careful consideration should be made as to the type and appropriate location for these sensors. There are many sensors that create a visual image for surveillance and devices to transmit and record our voices. These sensors produce information that can be directly interpreted with human senses such as sight to understand the events as they occur.

SUMMARY OF THE INVENTION

The present invention provides a novel approach to integrate sensors with a new vocabulary for events that occur in our environment. In an embodiment of the invention, application platforms include a gateway utilizing sensor information to tailor the environment that we live in, monitor the environment for safety, and to provide commercial establishments a way to more closely address the needs and interests of people.

The system of the present invention includes a "Full Spectrum" sensor that combines the output of a proprietary radio frequency (RF) to direct current (DC) converter technology with sensors covering other parts of the EMR spectrum and mechanical spectrum. The spectra covered is generally non-ionizing EMR with the exception of ultraviolet. Mechanical energy converted to electrical signals from mechanical movement such as vibration is also considered a part of the sensor fusion system of the present invention. The "Full Spectrum" sensor in combination with an application platform is designed to allow for the sensing of events previously not reportable and in a way that can be easily processed by various applications. The output data from the sensors is fused and combined in various ways for each application platform to overcome the "observational uncertainty" associated with unfused and/or uncombined data from traditional sensors so that the application platforms can rely on data as events. For example, the system of the present invention may detect the presence of an individual in a space and whether or not they are using a cell phone. Sensors are configured to detect EMR and/or RE to DC converted data that is subsequently fused by the "Full Spectrum" sensor to produce useful information that determines the presence of an individual and use of a cell phone. An application platform can then use that information to act on to create an appropriate environment for the individual by adjusting a plurality of environmental settings, i.e., temperature, volume, lighting, etc.

The "Full Spectrum" sensors are configured by the application platforms to convert the sensors into voltage levels that are combined and scaled in different combinations depending on the particular application. The "Full Spectrum" sensors are reported and synchronized in time with each other in order to fuse or combine the data in a meaningful way. The sensors embodied in this invention are intended to produce derivative results that can be stored and processed or combined with local processing in order to reduce the chance of misuse.

The sensors and/or RF to DC converters are configured into sensor arrays depending upon the particular application platform; each sensor array made up of at least one sensor. A particular sensor and/or RF to DC converter may be associated with at least one sensor array or may be associated with a plurality of sensor arrays. The particular configuration of each sensor array is dependent upon the particular application platform using the data collected from that sensor array. The sensors and/or RF to DC converters collect data from the EMR spectrum and mechanical spectrum. A particular sensor array may be associated with a particular function that relies on one or more data points, such as Amplitude, Chaoticness, Phase relationship, Periodicity, Sensor frequency, Reported bandwidth, Time stamp, and the like. The "Full Spectrum" sensor fuses the data points collected from the sensors of each sensor array. The fused data is saved in a database of a networked server and/or cloud based server. A gateway synchronizes the time with the fused data so that the fused data conveyed to the application platforms is reported and synchronized in time with each other. A particular application platform is then able to access the relevant fused data for that particular application to act upon events detected by the "Full Spectrum" sensors.

The present invention overcomes the deficiencies of the prior art by providing a system for fusing data collected from detected electromagnetic radiation and mechanical signals. The system includes at least one sensor wherein the at least one sensor is associated with at least one sensor array, A "Full Spectrum" sensor is configured to fuse the output of the at least one sensor with other sensors covering additional parts of the electromagnetic radiation spectrum and mechanical signals. At least one gateway is configured to synchronize the time of the fused output data. At least one application platform is configured to access the fused output data to provide meaningful feedback. The at least one sensor may include a radio frequency to direct current converter, wherein the converter may be a capacitor to DC converter or an inductor to DC converter. The system also includes a hardware controller that may include a processor and non-volatile and volatile memory.

The present invention also includes a method for fusing data collected from detected electromagnetic radiation and mechanical signals. At least one sensor receives a signal. The at least one sensor is associated with at least one sensor array. A "Full Spectrum" sensor fuses the output of the at least one sensor with other sensors covering additional parts of the electromagnetic radiation spectrum and mechanical signals. A gateway synchronizes the time of the fused output data. At least one application platform accesses the fused output data to provide meaningful feedback. The method also includes the processing of signals, RE; communication that may include ISM band communication and/or cellular, amplification, analog to digital conversion, and trilateralization by a hardware controller. The method also includes the storing of metadata associated with the fused output data, and the providing of feedback to at least one application platform. The method includes the controlling or altering of the operations of the at least one application platform.

DETAILED DESCRIPTION OF EMBODIMENTS

1. Definition of Terms

Amplitude—Voltage level is the peak, minimum, average, or instantaneous amplitude. The time interval and the unit of measure is defined as part of the hardware configuration for each Function name.

Chaoticness—An index related to Lypunov equations. This is used by the application to determine whether the information returned by the sensor hardware presents itself with a low enough level of uncertainty. When the sensors are configured properly this value should be very low indicating that the sensor is stable. The tolerance that is set is dependent on the application.

Phase relationship—The Delta difference in phase between signals from two different sensors.

Periodicty—quantization of periodic change in amplitude of the sensor. The synchronicity of the output of two or more sensors can be calculated with the Phase relationship and Periodicity.

Sensor Frequency—the center frequency of the sensor in current configuration

Reported bandwidth—The bandwidth of the received signal relative to the Sensor Frequency (center frequency). This information is relevant when determine the type of RF technology in use.

Time Stamp—time as calibrated by the hub or gateway.

2. Detailed Description of Drawings

Further features and advantages of the invention, as well as the structure and operation of various embodiments of the invention, are described in detail below with reference to the accompanying FIGS. 1-8, wherein like reference numerals refer to like elements.

The novel approach of the present invention fuses data from RF-DC converters and other sensors covering many parts of the EMR spectrum and mechanical spectrum by the use of a novel system of application platforms, gateways, and sensors. The "Full Spectrum" sensor of the present invention is designed to fuse information from RE-DC converters and other sensors covering many parts of the EMR spectrum and mechanical spectrum in a way that can be easily processed by various application platforms. The system of the present invention includes a hardware controller that fuses information from the RF-DC converters and other sensors by electronically modifying a hardware filter, oscillators, and analog-to-digital sampling rates based on each function's configuration. The signal that is converted by an analog-to-digital converter may be scaled at the time of analog-to-digital conversion or mathematically in the controller. This scaling feature enables the system to fuse the output from multiple sensors into a single value that is conveyed to the various application platforms. This allows the application platforms to utilize and act on events in a way not previously possible.

The application platforms may be any system that uses data gathered from sensors covering the EMR spectrum and mechanical spectrum. The application platforms embodied in this invention are by way of non-limiting examples and represent only a few embodiments that function as a result of using these types of sensors. For example, the fused data may be used in a variety of application platforms including, but not limited to, a speaker system, a theatre system, a security system, a motion detection system, a lighting system, a health monitoring system, indoor tracking and/or navigation, or any system used to track daily activities and the like.

The system of the present invention includes a "Full Spectrum" sensor that combines the output of a proprietary radio frequency (RE) to direct current (DC) converter technology with sensors covering other parts of the EMR spectrum and mechanical spectrum. The converter may be a radio frequency (RR) converter, a capacitor to DC converter, an inductor to DC converter, or any converter configured to convert EM radiation to DC. Once the EM radiation is converted to DC, it is transmitted to the microcontroller for interpretation and identification of the type of EM radiation and ultimately the device emitting said EM radiation. In some embodiments, the RF to DC converter may be a rectifier operating via diodes. A full-wave rectifier, known to those of ordinary skill in the art, operates by converting the whole of the input waveform to one of constant polarity (positive or negative) at its output. Full-wave rectification converts both polarities of the input waveform to pulsating DC and yields a higher average output voltage. Two diodes and a center tapped transformer, or four diodes in abridge configuration and any AC source (including a transformer without center tap) are needed. Single semiconductor diodes, double diodes with common cathode or common anode, and four-diode bridges, are manufactured as single components. Once the RF signal is converted to DC, the hardware controller will interpret and fuse the data with other sensors of a sensor array.

The "Full Spectrum" sensor as embodied in the present invention fuses the output of the range of sensor elements both collocated together and as an array of non-collocated sensors. The non-collocated sensors may be integrated into a single array of sensors by trilateralization if located inside or geolocated if outdoors by means of GPS. Particular import is given in this invention to the use of ambient RF energy that now permeates our environment.

The system of the present invention includes a gateway used to synchronize the time with the fused data so that the fused data conveyed to the application platforms is reported and synchronized in time with each other. The various application platforms are therefore receiving time synchronized fused data that can then be utilized and acted upon in a time sensitive fashion. The application platforms configure the "Full Spectrum" sensors such that the sensors convey the information in discrete time or time intervals relevant to that particular application platform. As such, the "Full Spectrum" sensors are used to fuse and combine the individual and/or array of sensor observations in time in a way that can be easily processed for various application platforms thereby greatly improving the accuracy and classification of events reported as they occur in real time.

The phase, frequency, and amplitude information produced by the full spectrum sensor, as configured by the application platforms, is in a standardized method so that the applications receive observed events instead of relying on cross correlation of data to infer events based on fitting to a predictive model.

Figure 1:
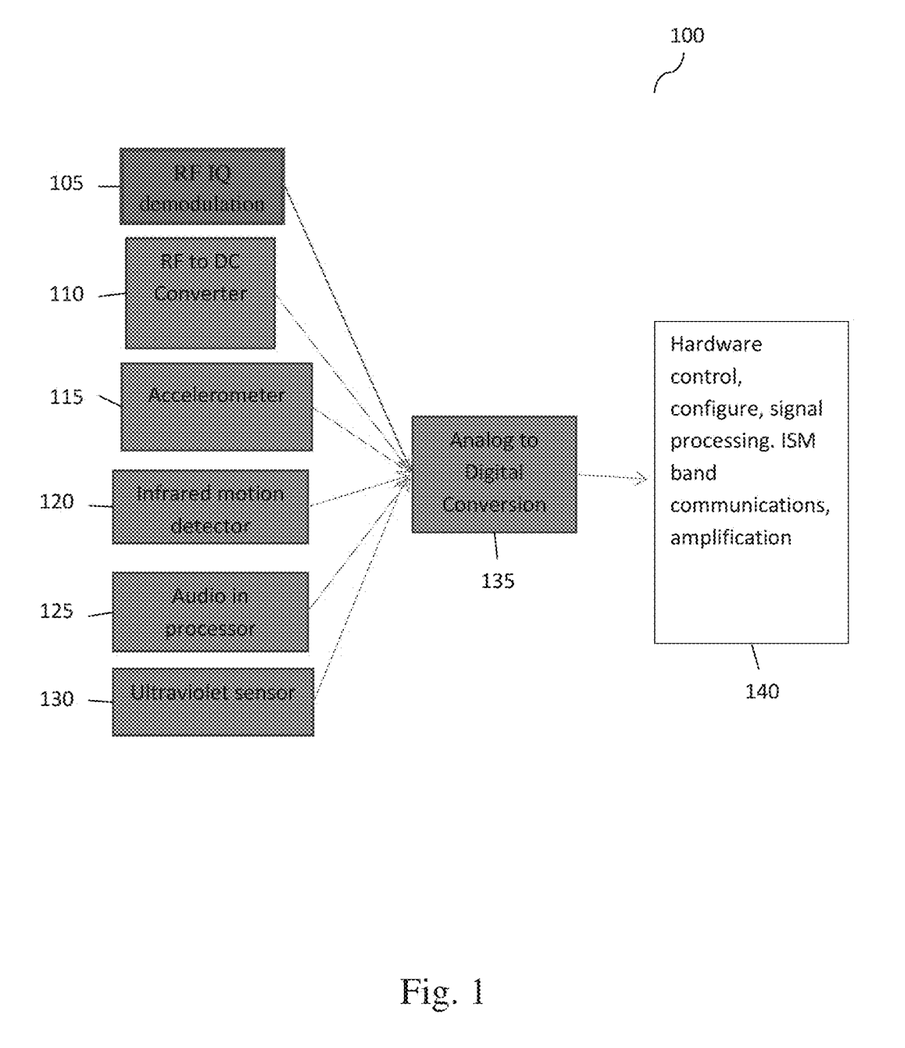
FIG. 1 illustrates a sensor array, including a plurality of sensors providing output to the sensor fusion system according to an embodiment of the invention.

FIG. 1 illustrates a sensor array, including a plurality of sensors providing output to the sensor fusion system according to an embodiment of the invention. The "Full Spectrum" Sensor 100 combines the output from a plurality of sensors as illustrated in FIG. 1. By way of non-limiting example, the plurality of sensors may be a RF IQ demodulator 105, a RF to DC converter 110, an accelerometer 115, an infrared motion detector 120, an audio in processor 125, and/or an ultraviolet sensor 130. The "Full Spectrum" sensor 100 is configured to perform an analog to digital conversion 135. A software module configures a hardware control 140 for its particular application platform and processes the information that is conveyed to it. The hardware control 140 may electronically modify a hardware filter, oscillators, and analog-to-digital sampling rates based on each function's and application platform's configuration. The sensor fusion system may have a plurality of sensor arrays that are providing data to the "Full Spectrum" sensor. Each sensor array may be configured according to a particular application platform to include relevant sensor(s). Moreover, depending of the particular application platform, 1 . . . n sensor arrays may be needed to provide data to the system.

Figure 2:
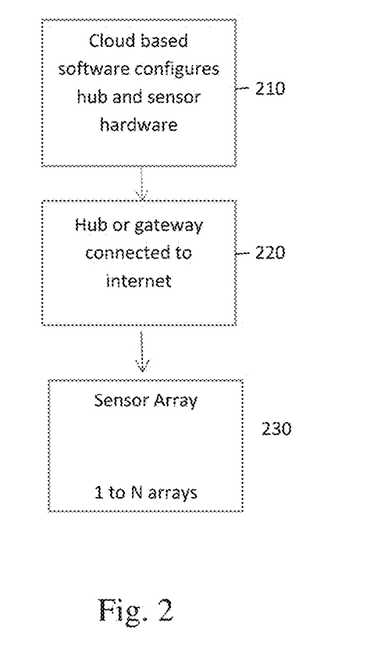
FIG. 2 illustrates the interaction of the gateway with at least one sensor array of the sensor fusion system according to an embodiment of the invention.

FIG. 2 illustrates the interaction of the gateway with at least one sensor array of the sensor fusion system according to an embodiment of the invention. The cloud based software may contain an Application Programming Interface (API), business logic, and user interfaces so that the system can interact with a human user or another machine. The software application 210 configures the hardware for its particular application platform and processes the information that is conveyed to the system. A hub or gateway 220 synchronizes the time with the fused data so that the fused data conveyed to the application platforms is reported and synchronized in time with each other. The gateway 220 may be combined and collocated with in some embodiments, e.g., body worn devices. The hardware controller may electronically modify a hardware filter, oscillators, and analog-to-digital sampling rates based on each function's configuration. The signal that is converted by an analog-to-digital converter may be scaled at the time of analog-to-digital conversion or mathematically in the controller. This scaling feature enables the system to fuse the output from multiple sensors into a single value that is conveyed to the various application platforms. Specific examples will be discussed herein within the context of specific application platforms of the system.

Figure 3:
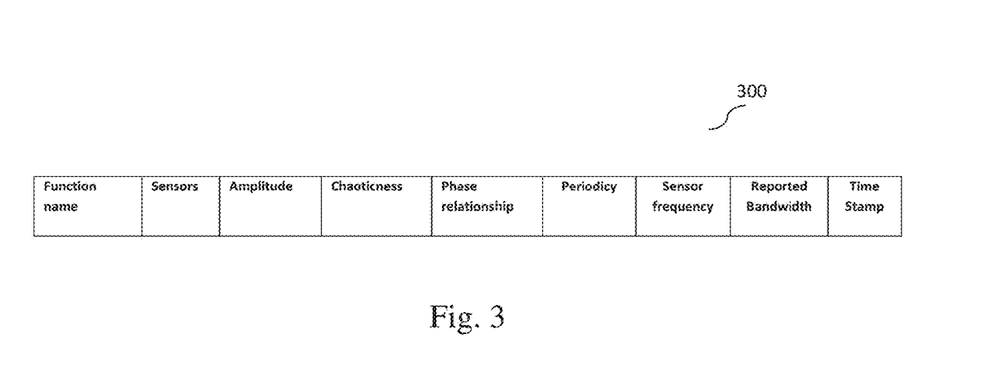
FIG. 3 illustrates a non-limiting example of the functions and type of data collected and conveyed to the sensor fusion system according to an embodiment of the invention.

The sensors are configured to convey the information as shown in FIG. 3 by the applications. The information is expressed in the time domain at discrete time intervals. Some of the information such as frequency are in the frequency domain but expressed at a discrete time.

FIG. 3 illustrates a non-limiting example of the functions and type of data collected and conveyed 300 to the sensor fusion system according to an embodiment of the invention. In FIG. 3, there may be 1 . . . n functions defined as part of the system. Each function will return information for a specific sensor array configuration. Each function and sensor array can be named and all relevant data collected according to that function stored in a database of the system. An example of the types of data that may be collected for a particular function may include, but is not limited to, Amplitude, Chaoticness, Phase relationship, Periodicity, Sensor frequency, Reported bandwidth, Time stamp, and the like.

Multiple application platforms can subscribe to the information sent to the cloud based server but may also access this information through the API. Credentials and security systems will be based on internet best practices and are not discussed here. In addition, not all of the data returned from the various sensor arrays is relevant for all application platforms. For example, for a given sensor array only Amplitude, Chaoticness, and Periodicity may be relevant. Therefore, in this example, an application platform, subscribing to the data from this given sensor array, will only require Amplitude, Chaoticness, and Periodicity as defined by the function associated with this sensor array.

Figure 4:
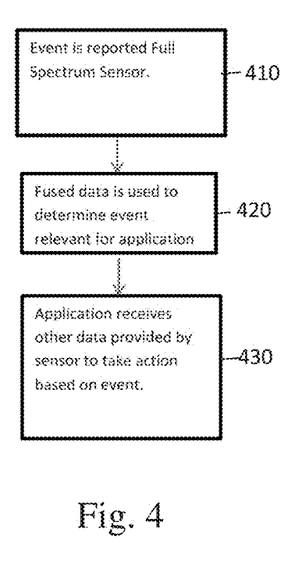
FIG. 4 illustrates a process flow of the sensor fusion system according to an embodiment of the invention.

FIG. 4 illustrates a process flow of the sensor fusion system according to an embodiment of the invention. The application platforms are integrated with the "Full Spectrum" sensors in the following way. First the various fusions of the full spectrum sensor report an event 410. The application platforms are notified of events that are subscribed to by the application 420. Then the application platform may receive the remainder of the information from that fusion or fusions of the data to act on as described herein 430.

The system of the present invention is capable of being implemented in a plurality of application platforms. The following examples are therefore not exhaustive and are included to aid in the detailed description of the present invention. Those of skill in the art will appreciate and understand the implementation of the present system in a plurality of application platforms.

EXAMPLES

Example 1

Smart audio system/speakers for event monitoring and music playing: Nearly all homes have speaker systems. Typically, home audio speaker systems are used only to play music and/or surround sound for television and movies. In an embodiment of the invention, strategic placement of the speaker system in a house containing integrated "Full Spectrum" sensors, the speakers themselves can replace a number of other sensors commonly used in a house such as motion detectors thereby creating a smart audio system/speaker. The integrated speakers can also be used by an application platform to remind or inform people of events, appointments, medications to take, and the like. More importantly, by combining and locating the speakers in the environment using trilateralization, a plurality of new application platforms may be created. Instead of traditional stand alone speakers, now the integrated speakers with "Full Spectrum" sensors fuse the signals that are built into the smart audio system speakers. These can be placed and then manually mapped to specific rooms in the house. In an exemplary embodiment, at least four smart audio system/speakers are placed in each room of the house to take full advantage of the various application platforms. The integrated smart audio system speaker with the "Full Spectrum" sensors communicates with a gateway by ISM band radios.

Figure 5:
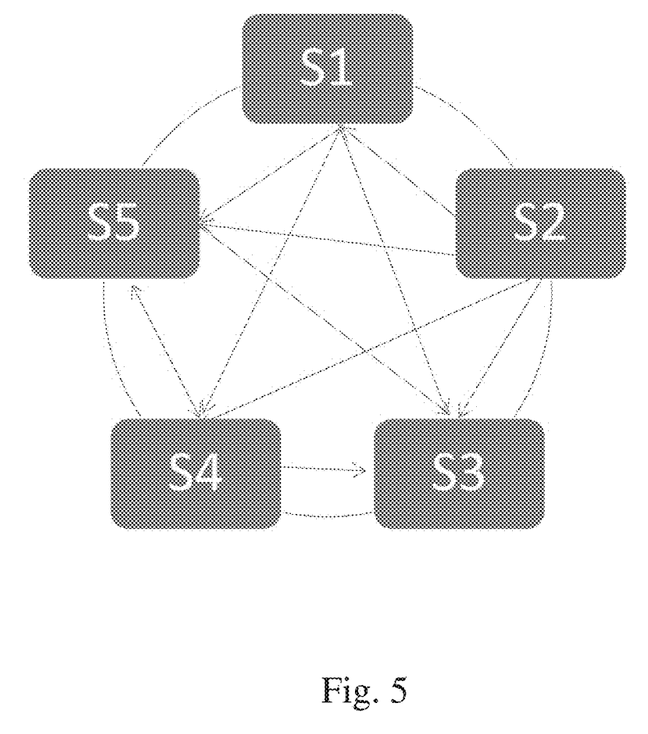
FIG. 5 illustrates one example of trilateralization of the sensor fusion system according to an embodiment of the invention.

The smart speakers are used with a microphone to facilitate trilateralization. Using a pure tone sound, the system is able to measure the distance between sensor elements to build a spatial map of the distance between multiple units, an example of which is illustrated in FIG. 5. These can be named by a software module so that location information can be used by various application platforms. In some embodiments, mapping may be done manually and input into an application platform. In this example, sound is used since time delay can be more easily measured due to the speed of sound being orders of magnitude slower than light or RF. Audible sound frequencies are between 20 HZ to 20,000 HZ and sound travels at the speed of 340 meters per second.

In some embodiments, trilateralization may be performed using the RF sensors in a normal site room by measuring the amplitude of the RF signal received from a RF transmitter collocated with a nearby sensor. The amplitude reduces dramatically over distance based on the inverse square law. The RF average RF signal amplitude is measured over a few seconds to allow for differences due to modulation. For example using the formula Path loss (dB)=20 log_10 (d)+ 20 log_10 (f)+32.44−Gtx−Grx. Convert to Db d=10 [path loss (db)−]

Gtx is Transmit antenna gain
Grx is Receive antenna gain.

So the path loss for a 2.4 gHz signal is 40 dB for one meter and 46 dB for 2 meters and 60 dB for 10 meters.

The distance calculation is done by fusing the amplitude measured over the full 2.4 gHz or 5.6 gHz ISM band in order to reduce the effects of fading in the room.

Example 2

Security system: Automatic alarm systems operate by detecting an unusual movement pattern. Oftentimes, the alarm system detects normal movement patterns, such as pets and trees moving against the backdrop of a living window, thereby complicating motion detection. In addition, alarm systems have depended primarily on switches and sensors attached to windows and doors. This requires a lot of wiring or, if battery powered switches are used, a large number must be maintained on a regular basis. By using a combination of RF and infrared vibrations, an alarm system can determine whether the motion is in the room or outside. The Periodicity and Amplitude are used from the fused sensors to allow the application platform to determine whether there is movement inside. Once motion is detected inside the location, trilateralization can be used along with changes in the Amplitude and Chaoticness to determine whether there are large objects moving such as people or whether they are stationary.

Example 3

Figure 6:
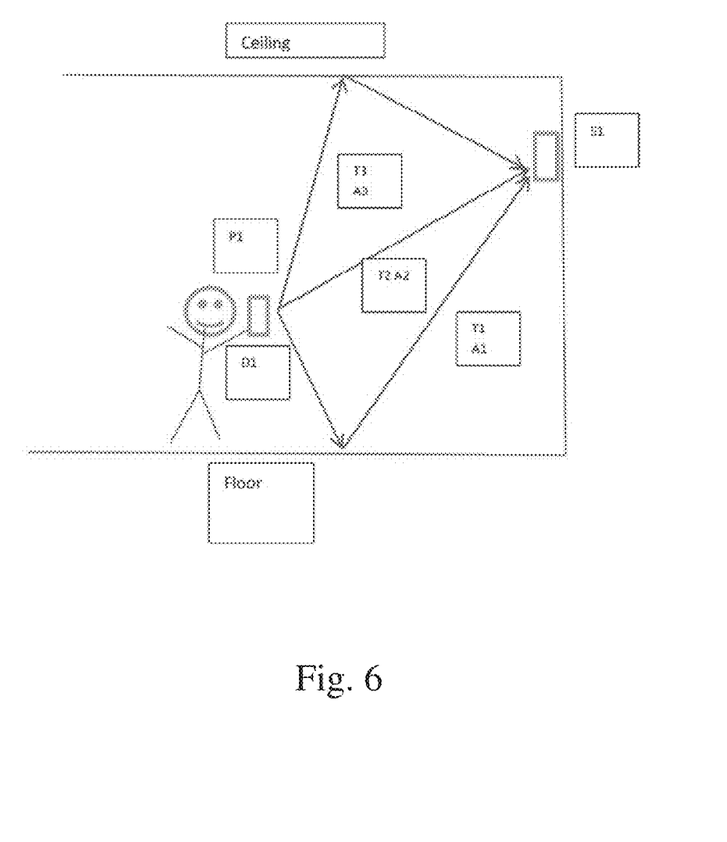
FIG. 6 invention illustrates one trilateralization example as applied to a cellphone application according to an embodiment of the invention.

Sensing the environment to control the noise or volume using the "Full Spectrum" sensors and smart speaker system. This application platform is used to selectively control the room background noise in order to make the environment more conducive to various activities. For example, the fusion sensors may detect the use of a cell phone in the room. The system may initiate noise cancellation that is directed in the vicinity of the cell phone to create a quite zone around the individual seeking to place a call. Using trilateralization of the RF Amplitude, the location of the individual is determined. FIG. 6 illustrates one trilateralization example as applied to a cell phone application according to an embodiment of the invention. The fusion sensors are configured to determine, detect, and report the human voice. The voiced speech of a typical adult male will have a fundamental frequency from 85 to 180 Hz, and that of a typical adult female from 165 to 255 Hz. That is, the frequency ranges (of the fundamental frequency) are about an octave apart, for males and females. This step is required since detection of the actual use of a device is more and more difficult without fully demodulating and then analyzing the protocol being used. The noise cancelling can be used to cancel the ambient room noise. FIG. 6 is used to illustrate that a cell phone can be used for trilateralization using Amplitude A1 . . . A3. In the figure there is only one sensor array (S1) shown, but in an exemplary embodiment, there should be a minimum of three sensors for trilateralization. Once the location of the individual using a cell phone is known, the microphones for each sensor receive sound from the location from T1 . . . T3. T2 is used by calculating the beginning of each burst of sound and back calculating the out of phase signal delayed no that the maximum inverse phase will occur at the time position based on trilateralization.

Example 4

Using sensors to detect when a person, who is watching television, leaves the room. Using an application platform reporting what is being screened or streamed on television, the "Full Spectrum" sensor can determine whether a person is leaving the room during commercials by using the changes in Chaoticness and Amplitude of the fusion sensors that combine both RF and motion detection. The system is configured to compare the phase relationship of the sensors and to detect the transition from one room to another by analyzing the relationship of the sensor patterns. For example, if an individual is wearing a body worn sensor, the changes in audio characteristics combined with the individual's motion can determine whether the individual left the room and returned. The information with respect to the individual's movements can be correlated with relevant channel information currently being televised. The channel information may be gathered through information provided by the streaming service, cable television service, etc., or more generically by the change in volume when there is a transition to a commercial. In alternative embodiments, multiple sensors, as described herein, may determine audio volume in a similar way as a body worn sensor, i.e., by motion and/or the absence of motion. This same information may then be correlated with the change in audio volume of the televised programming. As described herein with respect to various trilateralization methods, the multiple sensor technique of this example may use trilateralization to locate the television.

Example 5

Application platforms integrating other cloud based sensors. Application platforms using the APIs provided by third parties can be used to build a pattern of daily life. Likewise, the "Full Spectrum" sensors can provide information to other parties' applications through the API. The system may access calendars and provide audio alerts to users on a daily schedule by combining events sensed with other API events to create a tentative schedule. The system may be configured to simulate daily life through the recording and repletion of events based on combining other APIs with a smart sensor based diary. By fusing the data from other APIs and selecting combined events and using Kalman filtering and Bayesian equations to plot these over a period of time, the application platform can anticipate and take action based on events as they occur. This data is provided through the API with the same functions as shown in FIG. 3 but with the additional data element of elapsed time for data collection. An example implementation of this particular application platform may be the detection of reduced activity in a house and/or in a particular room whereby the temperature may be lowered or raised to adjust the ambient temperature.

Example 6

Figure 7:
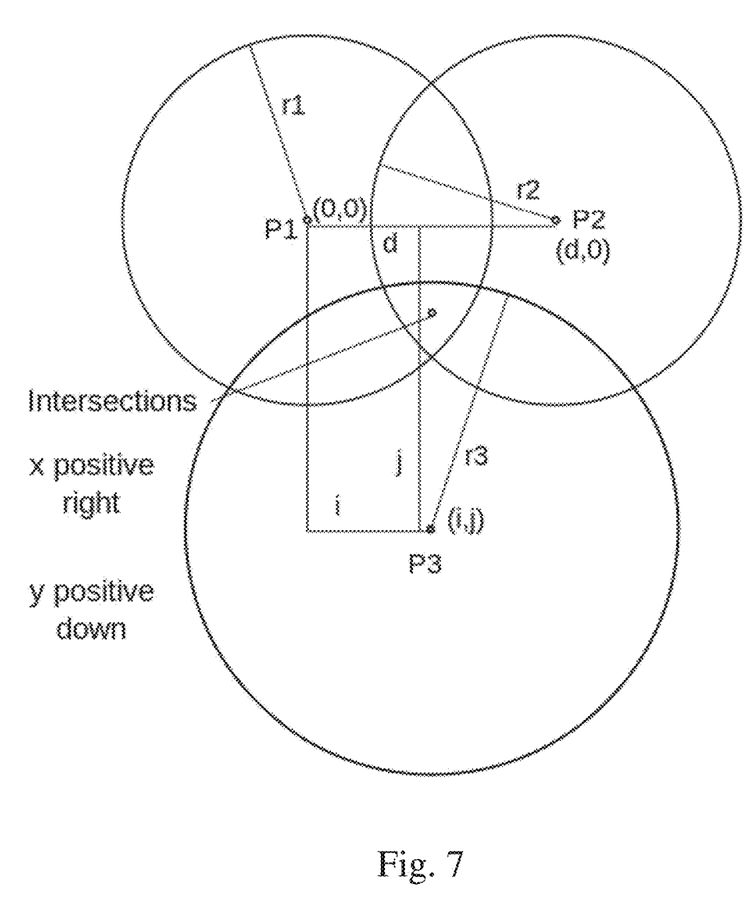
FIG. 7 illustrates another example of trilateralization of the sensor fusion system according to an embodiment of the invention.

Smart speakers at a theater application to optimize power consumption in the environment from sound volume to air-conditioning control. In a theatre that does not assign seating, a partially full house leaves many empty seats and possibly entire sections of the auditorium empty. It is useful to know where people are seating. In an embodiment of the system, reduction in the volume of speakers to reduce echo and to control the air conditioning ducts to direct most of the airflow to the most densely filled sections of the auditorium may be accomplished. The application platform scans the auditorium using the ISM band 2.4 ghz blue tooth emitted by each "Full Spectrum" sensor. A map of the empty auditorium is compared with the map of the auditorium with the audience seated. The delta Amplitude difference between the two maps produce a map of higher Amplitude where the audience is sparsely seated. Trilateralization is used again as part of this process in order to produce a x,y,z map where Z is Amplitude returned by fusing the data from the multiple sensors. FIG. 7 illustrates another example of trilateralization of the sensor fusion system according to this embodiment of the invention. The map of the auditorium while empty is built by comparing the Amplitude where the inverse square law is used to calculate the distance. The "Full Spectrum" sensor integrates the energy across the entire ISM band in order to reduce the effects of multipath on the received signal Amplitude.

Example 7

Figure 8:
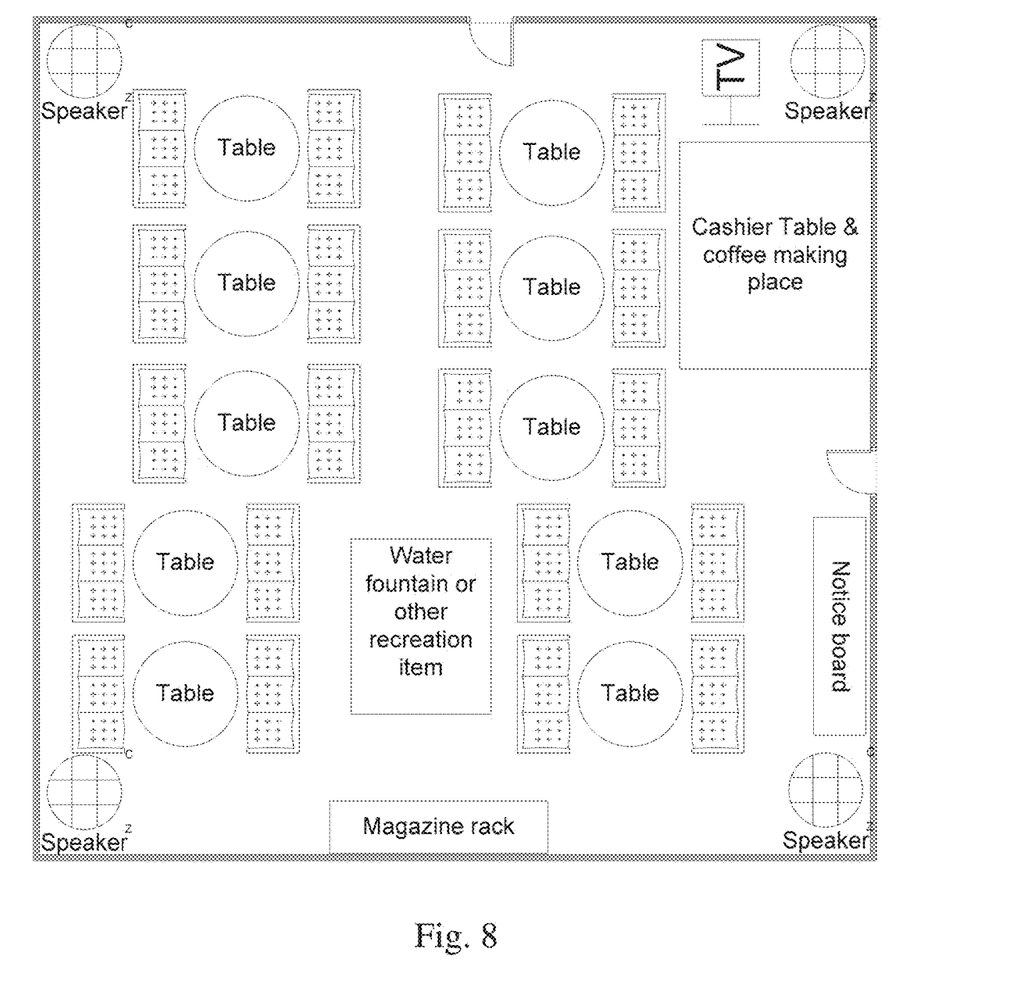
FIG. 8 illustrates a non-limiting example of an application platform according to an embodiment of the invention.

Commercial environment application platforms such as coffee shops and restaurants. FIG. 8 illustrates a non-limiting example of an application platform according to an embodiment of the invention. Illustrated in FIG. 8 is an exemplary layout of the system as depicted in a restaurant or coffee shop setting. Environmental feedback is an important piece of valuable information in a commercial setting. If a retail establishment is crowded and there are a lot of customers waiting, the shop owner may elect to play fast/rock/pop music with louder volume to encourage a rapid customer turnover. This application platform of this example uses a variety of sensors. The system can be used to distinguish between patrons that are walking and those that are sitting. Moreover, the system may be coupled to additional data sets to determine the number of people using cellular or Wi-Fi enabled devices and/or hotspots.

There are many ways to determine how long a table is occupied in a restaurant, coffee shop, and/or retail establishment by opening a ticket and measuring the time until the patron pays their bill. There is an advantage if the environment can be dynamically and automatically altered and metadata gathered easily. As described with the smart speaker system in the theater application platform of Example 6, a map is built of the premises while there are no people seated or present in the room using the ISM band radiated transmissions from the smart sensors as they bounce around the room. This creates the baseline radiation Amplitude pattern. When people are present in the room the delta of the Amplitude is compared to determine the location of people in the room.

Additional events can be detected for example using this application platform. The system may detect the location of individuals using a cell phone by using trilateralization of the Amplitude of the received RF spectrum. In addition, ISM band communications such as associate with a tablet computer can be detected as hot spots in the map since the inverse square law will make the Amplitude of the signal much higher than the signals of similar frequencies traversing the room as they are transmitted by the "Full Spectrum" sensor system.

Using the "Full Spectrum" sensor in the audio part of the spectrum a similar mapping of the room can determine whether people are engaged in conversation indicating groups of people or whether they are engaged in individual activities. Sophisticated application platforms may be implemented to alter the environment by increasing the loudness and tempo of the music to the environment through the smart speaker system with integrated "Full Spectrum" sensors. Environmental adjustment may be made by the system when the tables are occupied for a long period of time or to keep customers eating and drinking when the tables are sparsely occupied.

As these applications store their data in the cloud, a set of metadata is recorded that leads to a set of business and commercial establishment environmental analytics by monitoring, matching the phase, amplitude and frequency modulation of the various known signals in the environment over time. The same can be applied to other types of retail environments such as grocery stores or other aisle based retail environments. The data collected can be used to determine the best placement of merchandise and to quickly test the effectiveness of displays.

Coffee shop owners can know which seats or tables are preferred by customers. They can try to re-create the same environment for other seats or tables. For example, if customers prefer to sit near a water fountain, the owner can add additional water fountains or move the water fountains to certain location with the shop to attract more customers.

The number of people and event detection can be done by application platforms using the novel "Full Spectrum" sensor using, infrared sensors, motion detector/vibration, and/or detector/accelerometer. Typical events detected are: i) starting a cell phone conversation whereby the application will mute the ambient noise with noise cancellation; ii) increasing white noise or the volume of music in crowded environments; or iii) sending information to the cell phone data application when it is being used for data connection rather than constantly interrupting the customer.

Example 8

Body Worn "Full Spectrum" sensors. Another embodiment of the application of "Full Spectrum" sensors is the sensing of physiological attributes using ambient radiation. The system may be used to detect both heart rate and respiration rate, whether a person is leaving the premises, or moving about the premises. The system is configured to convert the energy over a wide range of spectrum to a series of data elements as described in FIG. 3. A particular spectrum may be used to determine whether a person is outside, such as the increase in Amplitude of a GPS frequency. Likewise, the energy from cellular, ISM, GPS bands may be fused by the "Full Spectrum" sensors to provide a passive non-contact way of discerning physiological activities such as heart rate, respiration, walking, and/or running where the accelerometer of the system is providing one data point for the range of spectrum applicable to this application platform.

Those of skill in the art will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein, and those provided in the accompanying documents, can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, and those provided in the accompanying documents. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein, and those provided in the accompanying documents, can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

The above description of the disclosed embodiments, and that provided in the accompanying documents, is provided to enable any person skilled in the art to make or use the invention. Various modifications to these embodiments will be readily apparent to those skilled in the art, and the generic principles described herein, and in the accompanying documents, can be applied to other embodiments without departing from the spirit or scope of the invention. Thus, it is to be understood that the description and drawings presented herein, and presented in the accompanying documents, represent particular aspects and embodiments of the invention and are therefore representative examples of the subject matter that is broadly contemplated by the present invention. It is further understood that the scope of the present invention fully encompasses other embodiments that are, or may become, obvious to those skilled in the art and that the scope of the present invention is accordingly not limited by the descriptions presented herein, or by the descriptions presented in the accompanying documents.

We claim:

1. A system for fusing data collected from detected electromagnetic radiation and mechanical signals, comprising:

at least one sensor, the at least one sensor associated with at least one sensor array;

at least one "Full Spectrum" sensor configured to fuse an output of the at least one sensor with other sensors covering additional parts of the electromagnetic radiation spectrum and mechanical signals;

at least one gate configured to synchronize a time of the fused output data; and at least one application platform, the application platform configured to access the fused output data to provide feedback about an environment.

2. The system of claim 1, further comprising a proprietary radio frequency to direct current converter.

3. The system of claim 2, wherein the converter is a capacitor to DC converter or an inductor to DC converter.

4. The system of claim 1, further comprising a hardware controller including a processor and non-volatile and volatile memory.

5. The system of claim 4, wherein the hardware controller is configured to process signals communicate via RF including ISM band communication and/or cellular, amplification, and analog to digital conversion.

6. The system of claim 4, wherein the hardware controller is configured to perform trilateralization.

7. The system of claim 4, wherein the hardware controller is configured to electronically modify a hardware filter, oscillator, and analog-to-digital sampling rates, wherein a signal being converted by an analog-to-digital converter is scaled at the time of the analog-to-digital conversion enabling the system to fuse the output from multiple sensors into a single value that is conveyed to the application platforms.

8. The system of claim 1, wherein the at least one sensor associated with at least one sensor array is non-collocated.

9. The system of claim 1, wherein the at least one sensor is selected from the group consisting of: radio frequency quadrature demodulation, radio frequency to direct current converter, accelerometer, infrared motion detector, audio in processing, and ultraviolet sensor.

10. The system of claim 1, wherein the at least one sensor array is associated with a particular function that relies on one or more data points for an output selected from the group consisting of: amplitude, chaoticness, phase relationship, periodicity, sensor frequency, reported bandwidth, and time stamp.

11. The system of claim 1, wherein the application platform is at least one selected from the group consisting of a smart speaker system, a smart theatre system, a security system, a lighting system, a health monitoring system, a motion detection system, and a commercial environment system.

12. The system of claim 1, wherein the fused output is available to third-party software applications through an application programming interface.

13. A method of fusing data collected from detected electromagnetic radiation and mechanical signals, including the steps of:

receiving a signal by at least one sensor;

associating the at least one sensor with at least one sensor array;

fusing an output of the at least one sensor with other sensors covering additional parts of the electromagnetic radiation spectrum and mechanical signals;

synchronizing a time of the fused data; and accessing the fused data to provide feedback about an environment.

14. The method of claim 13, further including the step of:

processing signals, RF communication including ISM band communication and/or cellular, amplification, and analog to digital conversion; and trilateralization by a hardware controller.

15. The method of claim 14, further including the step of:

electronically modifying a hardware filter, oscillator, and analog-to-digital sampling rates, wherein a signal being converted by an analog-to-digital converter is scaled at the time of analog-to-digital conversion enabling the system to fuse the output from multiple sensors into a single value that is conveyed to the application platforms.

16. The method of claim 13, wherein the at least one sensor is selected from the group consisting of: radio frequency quadrature demodulation, radio frequency to direct current converter, accelerometer, infrared motion detector, audio in processing, and ultraviolet sensor.

17. The method of claim 13, wherein the at least one sensor array is associated with a particular function that relies on one or more data points from output selected from the group consisting of: amplitude, chaoticness, phase relationship, periodicity, sensory frequency, reported bandwidth, and time stamp.

18. The method of claim 13, further including the steps of:

storing metadata associated with the fused output data; and providing feedback to at least one application platform selected from the group consisting of a smart speaker system, a smart theatre system, a security system, a lighting system, a health monitoring system, and a commercial environment system.

19. The method of claim 18, further including the step of:

controlling or altering the operations of the at least one application platform.

20. The method of claim 13, wherein the fused output is available to third-party software applications through an application programming interface.

* * * * *